ns patented Feb. 12, 1957

2,781,292

PROCESS FOR THE PRODUCTION OF Δ⁴-PREGNEN-11β, 14α, 17α, 21-TETROL-3,20-DIONE

Alejandro Zaffaroni and Felix Cordoba, Mexico City, Mexico, assignors to Syntex S. A., Mexico City, Mexico, a corporation of Mexico No Drawing. Application February 11, 1955,
Serial No. 487,709

1 Claim. (Cl. 195—51)

The present invention relates to a novel process for the production of cyclopentanophenanthrene derivatives.

More particularly the present invention relates to a process for the production of the cortical hormone Δ⁴-pregnen-11β,14α,17α,21-tetrol-3,20-dione. The compound produced by the process of the present invention is a useful hormone of the cortical type usable as anti-inflammatory agents and for the control of sodium excretion.

In United States Patent No. 2,643,970, there is disclosed a process for the production of 17α-hydroxycorticosterone by in vitro incubation of 17α-hydroxyprogesterone. This reaction, however, was thought to be specific to production of the compound there disclosed.

In accordance with the present invention, however, it has been discovered that a similar incubation of Δ⁴-pregnen-14α,17α,21-triol-3,20-dione produces Δ⁴-pregnen-11β,14α,17α,21-tetrol-3,20-dione.

The process of the present invention may be illustrated by the following equation:

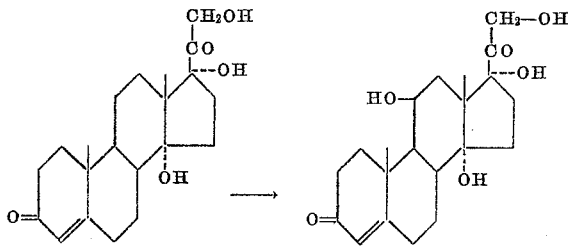

In carrying out the process of the present invention, fresh animal adrenal glands, which may be used immediately after slaughtering or kept in a container surrounded by ice-salt mixture for periods not longer than twelve hours, may be ground in a meat grinder or suspended in a buffer solution to be hereinafter described in detail and homogenized as with a Waring Blender. The finely divided adrenal gland tissue is mixed with a buffer solution which is capable of maintaining a pH of from 6.8 to 7.8. These buffer solutions may be of a well-known type, such as phosphate, carbonate, veronal or borate buffers, although a phosphate buffer is preferred. The buffer solution utilized is made up by adding sufficient buffer salt solution to a physiological saline solution which may also contain, in addition to the sodium chloride of the saline solution, small amounts of potassium and magnesium ions. Further, the buffer solution should also contain as a reaction promoting agent an alkali metal salt of fumaric or citric acid, as for example potassium or sodium fumarate or citrate. The fumarate or citrate salt is preferably present in the buffer solution in an amount equivalent to at least two and one-half mols of the salt to two hundred parts by weight or grams of the buffer solution, although larger amounts may be utilized.

The homogeneous mixture, either by stirring or homogenizing of the finely divided adrenal gland material, should preferably contain one part of tissue to three parts of solution; although it is within the scope of the present invention to utilize from one part of solution to five parts of solution to each part of tissue. The aqueous solution is preferably at a temperature of 37° C. when the mixture with the adrenal tissue is made. This temperature is also preferably maintained during the subsequent incubation which is carried for a period of the order of two hours. Longer periods may also be utilized and the reaction appears to be substantially complete at the end of one hour and at least partially complete at the end of shorter periods, as for example 20 minutes. The starting compound (Δ⁴-pregnen-14α,17α,21-triol-3,20-dione) can be added to the aqueous mixture in solution in an organic solvent, preferably propylene glycol, this solution being also maintained at the same temperature as the incubation medium, i. e., preferably 37° C.

The steroid starting compound is preferably in relatively dilute solution in the propylene glycol, as for example one part of the steroid to thirty parts of propylene glycol, although larger or smaller amounts may be used. Preferably, an amount of incubation medium is utilized so that for each part of the steroid there is a large amount of tissue, as for example one part of steroid to a thousand parts of tissue. During the entire period of incubation the mixture hereinbefore set forth is subjected to agitation.

Although the preferable temperature for incubation, as previously indicated is 37° C. the incubation takes place quite readily at temperatures just above room temperature, as for example 25° C. and in general temperatures between 5 and 45° C. may be utilized. When the reaction is complete, the reaction mixture may then be extracted with an organic solvent, such as chloroform and chromatographic separation is then preferably utilized for the separation of the product. In the alternative, other methods of separation, such as dialysis, may be utilized.

The following specific example serves to illustrate but is not intended to limit the present invention:

*Example*

A physiological saline solution (physiological serum) is prepared, containing potassium and magnesium ions, in the following manner:

800 cc. of 4% sodium chloride
32 cc. of 5.8% potassium chloride
8 cc. of 19.1% magnesium sulphate heptahydrate
Completed with water to 400 cc.

440 cc. is added of a buffer solution of 0.1M of monobasic sodium phosphate and dibasic potassium phosphate having a pH of 7.4, and then 1 lt. is added of a 0.15M solution of sodium fumarate previously adjusted to pH 7. 800 cc. of this solution is mixed with 400 g. of bovine suprarenal glands of recently slaughtered animals and the mixture is homogenized in a blender. A solution of 500 mg. of Δ⁴-pregnen-14α,17α,21-triol-3,20-dione in 50 cc. of propylene glycol is then added and the mixture is incubated at 37° C. in a constant temperature water bath for a period of 2 hours under continuous stirring. After this time, the reaction mixture is extracted with chloroform with the use of a centrifuge for the efficient separation of the phases. Chromatographic separation in a column with 2000 g. of silica first affords a fraction of 290 mg. of Δ⁴-pregnen-14α,17α,21-triol-3,20-dione and then a fraction of 40 mg. of Δ⁴-pregnen-11β,14α,17α,21-tetrol-3,20-dione with melting point 223–225° C. Other unidentified fractions were obtained, weighing 50 mg. The tetrol product was sent to the research laboratories of Chas. Pfizer & Co., Inc., Brooklyn, New York, where it was identified, by comparison with an authentic sample previously prepared by a different method, as Δ⁴-pregnen-11β,14α,17α,21-tetrol-3,20-dione.

We claim:

A process for the production of Δ⁴-pregnen-11β,14α,17α,21-tetrol-3,20-dione comprising dissolving Δ⁴-pregnen-14α,17α,21-triol-3,20-dione in propylene glycol, adding the solution to an incubation mixture of finely divided animal adrenal tissue in a physiological saline solution containing potassium and magnesium ions and a buffer capable of maintaining a pH of from 6.8 to 7.8 and a salt selected from the class consisting of alkali metal fumarates and citrates, and incubating under agitation at a temperature of between 5 and 45° C. for at least 20 minutes, the adrenal tissue being present in an amount equal to from one part of tissue to 1 to 5 parts by volume of buffer solution, the starting compound being present in an amount approximately equal to one part of compound to 1000 parts of tissue, and the alkali metal salt being present in an amount equal to at least 2½ mols to each 200 parts by weight of the buffer solution.

References Cited in the file of this patent

UNITED STATES PATENTS

| | | |
|---|---|---|
| 2,666,016 | Hechter et al. | Jan. 12, 1954 |
| 2,676,904 | Jeanloz et al. | Apr. 27, 1954 |